United States Patent
Krogh et al.

(10) Patent No.: US 11,746,750 B2
(45) Date of Patent: Sep. 5, 2023

(54) RELATING TO ELECTRICAL POWER GENERATORS FOR WIND TURBINES

(71) Applicant: Vestas Wind Systems A/S, Aarhus N. (DK)

(72) Inventors: Lars Langvardt Krogh, Egå (DK); Rolf Nyborg Broge, Tilst (DK)

(73) Assignee: Vestas Wind Systems A/S, Aarhus N (DK)

( * ) Notice: Subject to any disclaimer, the term of this patent is extended or adjusted under 35 U.S.C. 154(b) by 165 days.

(21) Appl. No.: 17/606,165

(22) PCT Filed: Apr. 21, 2020

(86) PCT No.: PCT/DK2020/050105
§ 371 (c)(1),
(2) Date: Oct. 25, 2021

(87) PCT Pub. No.: WO2020/221403
PCT Pub. Date: Nov. 5, 2020

(65) Prior Publication Data
US 2022/0228563 A1 Jul. 21, 2022

(30) Foreign Application Priority Data
May 1, 2019 (DK) .......................... PA 2019 70275

(51) Int. Cl.
*F03D 9/25* (2016.01)
*F03D 80/70* (2016.01)
*F03D 80/80* (2016.01)

(52) U.S. Cl.
CPC .............. *F03D 9/25* (2016.05); *F03D 80/70* (2016.05); *F03D 80/88* (2016.05);
(Continued)

(58) Field of Classification Search
CPC . F03D 9/25; F03D 80/70; F03D 80/88; F05B 2240/61; F05B 2260/79
See application file for complete search history.

(56) References Cited

U.S. PATENT DOCUMENTS 7,815,536 B2 10/2010 Jansen et al.
8,008,798 B2 8/2011 Jansen et al.
(Continued)

FOREIGN PATENT DOCUMENTS

EP 2617994 A1 7/2013

OTHER PUBLICATIONS

China National Intellectual Property Administration, office action issued in corresponding Chinese Application No. 202080046284.1, dated May 4, 2023, with English translation.
(Continued)

*Primary Examiner* — Sean Gugger
(74) *Attorney, Agent, or Firm* — Wood Herron & Evans LLP

(57) ABSTRACT

There is provided a method (100) of installing a pitch tube (27) into an electrical power generator (24) for a wind turbine, the method comprising: installing (105a) the pitch tube (27) so that it is coaxial with a rotational axis (R) of the generator (24); supporting (105b) a bearing arrangement (50) associated with the pitch tube (27) at an end of the generator (24) using one or more primary supports (52), wherein each of the primary supports (52) comprises a first end (58) connected to the bearing arrangement (50) and a second end (60) connected to a component (32) associated with a rotating reference frame of the generator (24); and supporting (110) the bearing arrangement (50) using one or more secondary supports (54), wherein each of the secondary supports (54) comprises a first end (62) connected to the bearing arrangement (50) and a second end (64) connected
(Continued)

to a component (42) associated with a stationary reference frame of the generator (24).

14 Claims, 14 Drawing Sheets

(52) U.S. Cl.
    CPC ....... *F05B 2240/14* (2013.01); *F05B 2260/30* (2013.01); *F05B 2260/79* (2013.01)

(56) References Cited

U.S. PATENT DOCUMENTS

| | | |
|---|---|---|
| 8,376,708 B2 | 2/2013 | Patel et al. |
| 2010/0133854 A1* | 6/2010 | Jansen .................... F03D 80/70 290/55 |
| 2010/0329867 A1 | 12/2010 | Patel et al. |
| 2011/0068583 A1* | 3/2011 | Burkart .................. F03D 15/00 290/55 |
| 2011/0133469 A1 | 6/2011 | Jansen et al. |
| 2017/0130701 A1 | 5/2017 | Kaiser |
| 2017/0328352 A1 | 11/2017 | Kluemper et al. |

OTHER PUBLICATIONS

Danish Patent and Trademark Office, Search and Examination Report in PA 2019 70275, dated Dec. 11, 2019.
European Patent Office, International Search Report and Written Opinion in PCT Application No. PCT/DK2020/050105, dated Jun. 22, 2020.

\* cited by examiner

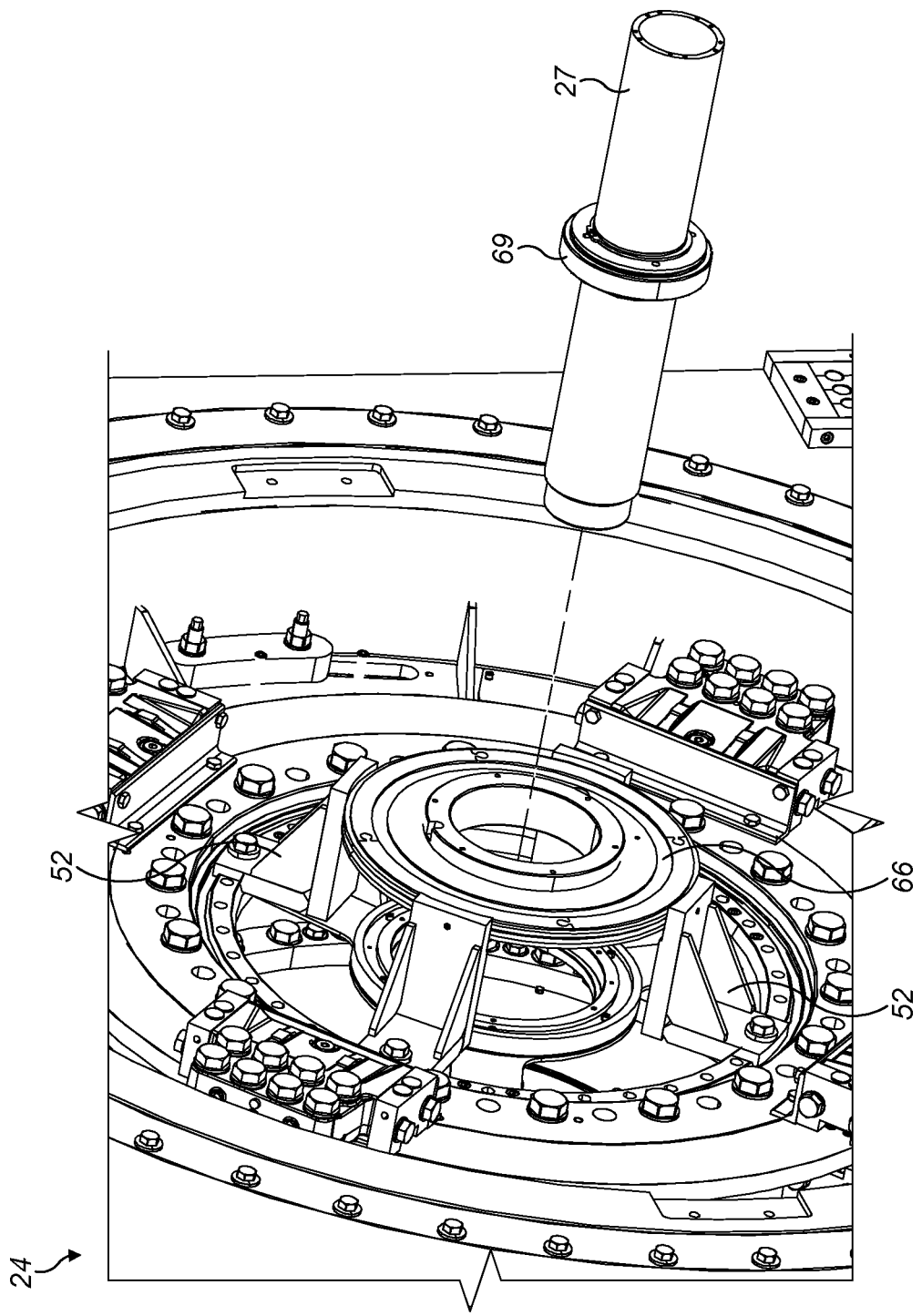

RELATING TO ELECTRICAL POWER GENERATORS FOR WIND TURBINES

TECHNICAL FIELD

The invention relates to an electrical power generator for a wind turbine, and more specifically to a system and method for installing a service conduit or 'pitch tube' and an end-shield in the electrical power generator.

BACKGROUND

As is well-known, wind turbines convert kinetic energy from the wind into electrical energy, using a large rotor with a number of rotor blades. A typical Horizontal Axis Wind Turbine (HAWT) comprises a tower, a nacelle on top of the tower, a rotating hub or 'rotor' mounted to the nacelle and a plurality of wind turbine rotor blades coupled to the hub. The nacelle houses many functional components of the wind turbine, including for example a generator, gearbox, drive train and rotor brake assembly, as well as convertor equipment for converting the mechanical energy at the rotor into electrical energy for provision to the grid. The gearbox steps up the rotational speed of the low speed main shaft and drives a gearbox output shaft. The gearbox output shaft in turn drives the generator, which converts the rotation of the gearbox output shaft into electricity. The electricity generated by the generator may then be converted as required before being supplied to an appropriate consumer, for example an electrical grid distribution system.

In some wind turbine designs, the hub houses several electrical and hydraulic sub-systems that are critical to the proper functioning of the wind turbine. For example, the hub may contain an electrically and/or hydraulically actuated blade pitch system, and a power control system for a blade anti-ice and de-ice system. In order to transport the necessary hydraulic and electrical services from the stationary frame of reference of the nacelle, to the rotating frame of reference of the hub, a service conduit or 'pitch tube' is typically provided.

Typically, in medium-speed wind turbines, such a pitch tube is usually located within the drive train of the wind turbine so as to extend through the generator and gearbox assemblies along their rotational axis and is configured to rotate in synchronisation with the low speed shaft. The pitch tube typically comprises a rotational transfer module which serves as a rotational interface between hydraulic and electrical supplies external to the pitch tube, and various hydraulic components and power cables within the pitch tube that extend along it towards the hub. In such medium-speed wind turbine systems, the pitch tube is normally supported by a bearing that is mounted within the generator. As is conventional in this technical field, the term "medium-speed" has been used to refer to wind turbines which operate at high power ranges (above 4-5 MW), typically have generator speeds in the range of around 100 to 600 rpm, and where, typically, only planetary gear stages are used and the generator and gearbox are co-axially positioned.

Since the pitch tube rotates with the low speed shaft, it is important that the pitch tube is aligned accurately with the rotational axis. Current approaches may involve mounting the pitch tube via a suitable bearing arrangement to a mounting bracket associated with the generator housing. However, such an approach has been found to present challenges in ensuring that the pitch tube is centred accurately on the rotational axis.

It is against this background that the invention has been devised.

SUMMARY OF THE INVENTION

According to a first aspect of the invention, there is provided a method of installing a pitch tube into an electrical power generator for a wind turbine. The method comprises: installing the pitch tube so that it is coaxial with a rotational axis of the generator; supporting a bearing arrangement associated with the pitch tube at an end of the generator using one or more primary supports, wherein each of the primary supports comprises a first end connected to the bearing arrangement and a second end connected to a component associated with a rotating reference frame of the generator; and supporting the bearing arrangement using one or more secondary supports, wherein each of the secondary supports comprises a first end connected to the bearing arrangement and a second end connected to a component associated with a stationary reference frame of the generator.

Advantageously, the method of the invention provides a more accurate assembly process for the pitch tube which ensures it is located at a precise central position with respect to the rotational axis of the generator. This is because an initial step involves supporting the pitch tube by the primary supports which are connected to a component associated with the rotating reference frame of the generator. This may be the rotor of the generator, for example. Since the rotor is datumed accurately at the rotational axis of the generator, the pitch tube will also be datumed accurately by being supported on the rotor by the primary support. Once accurately mounted, the pitch tube can then be connected to the generator housing using the secondary support arms, at which point the primary supports can be removed.

In some embodiments, the method may further comprise, after the bearing arrangement has been supported by the one or more secondary supports, disconnecting the one or more primary supports from the bearing arrangement and the component associated with the rotating reference frame of the generator. This advantageously enables the well-aligned pitch tube to be simply mounted only with respect to the stationary reference frame of the generator (e.g. to the generator housing) for the rest of the operational lifetime of the wind turbine.

In some embodiments, the method further comprises attaching a plurality of cover components to the one or more secondary supports to span an open area defined by an end opening of a generator housing. In some embodiments, attaching the plurality of cover components comprises fitting the cover components together to define a continuous cover over the end opening of the generator housing.

In some embodiments, the attaching of the plurality of cover components is carried out after disconnecting the one or more primary supports.

In some embodiments, the component associated with the rotating reference frame of the generator comprises a rotor hub component of the generator. Optionally, supporting the bearing arrangement using one or more primary supports comprises connecting the second end of each of the primary supports to the rotor hub component.

In some embodiments, the component associated with the stationary reference frame of the generator comprises a generator housing component. Optionally, supporting the bearing arrangement using one or more secondary supports comprises connecting the second end of each of the secondary supports to an end face of the generator housing component.

Optionally, each of the primary supports comprises an L-shaped bracket.

According to another aspect of the invention, there is provided a wind turbine comprising a wind turbine tower, a nacelle rotatably coupled to the tower, a rotating hub mounted to the nacelle, and a plurality of wind turbine blades coupled to the hub, wherein the nacelle comprises an electrical power generator having a pitch tube installed by the method substantially as described above.

According to another aspect of the invention, there is provided an electrical power generator for a wind turbine comprising: a generator housing; a generator rotor located within the generator housing and being accessible through an end opening of the generator housing, the rotor defining a rotational axis of the generator; a pitch tube extending through the rotor and being coaxial with the generator rotational axis, the pitch tube having an end that is supported by a bearing arrangement proximal with the generator housing end opening; a plurality of support members connected between the bearing arrangement and a component of the generator housing; and a plurality of cover components arranged on the plurality of support members so as to form a continuous cover for the end opening of the generator housing.

In some embodiments, each of the plurality of cover components extends between at least a pair of the plurality of support members.

In some embodiments, each of the support members is a planar member that when connected between the bearing arrangement and the generator housing component, is positioned to coincide with an end face of the generator housing.

Optionally, the electrical power generator comprises at least four support members and four cover components, wherein each of the cover components forms a quadrant of the continuous cover for the end opening of the generator housing.

According to another aspect of the invention, there is provided a wind turbine comprising a wind turbine tower, a nacelle rotatably coupled to the tower, a rotating hub mounted to the nacelle, and a plurality of wind turbine blades coupled to the hub, wherein the nacelle comprises the electrical power generator substantially as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which:

FIGS. 6a and 6b are perspective exploded views of the generator of FIG. 4 illustrating another example implementation of the primary pitch tube installation step;

Figure 1:
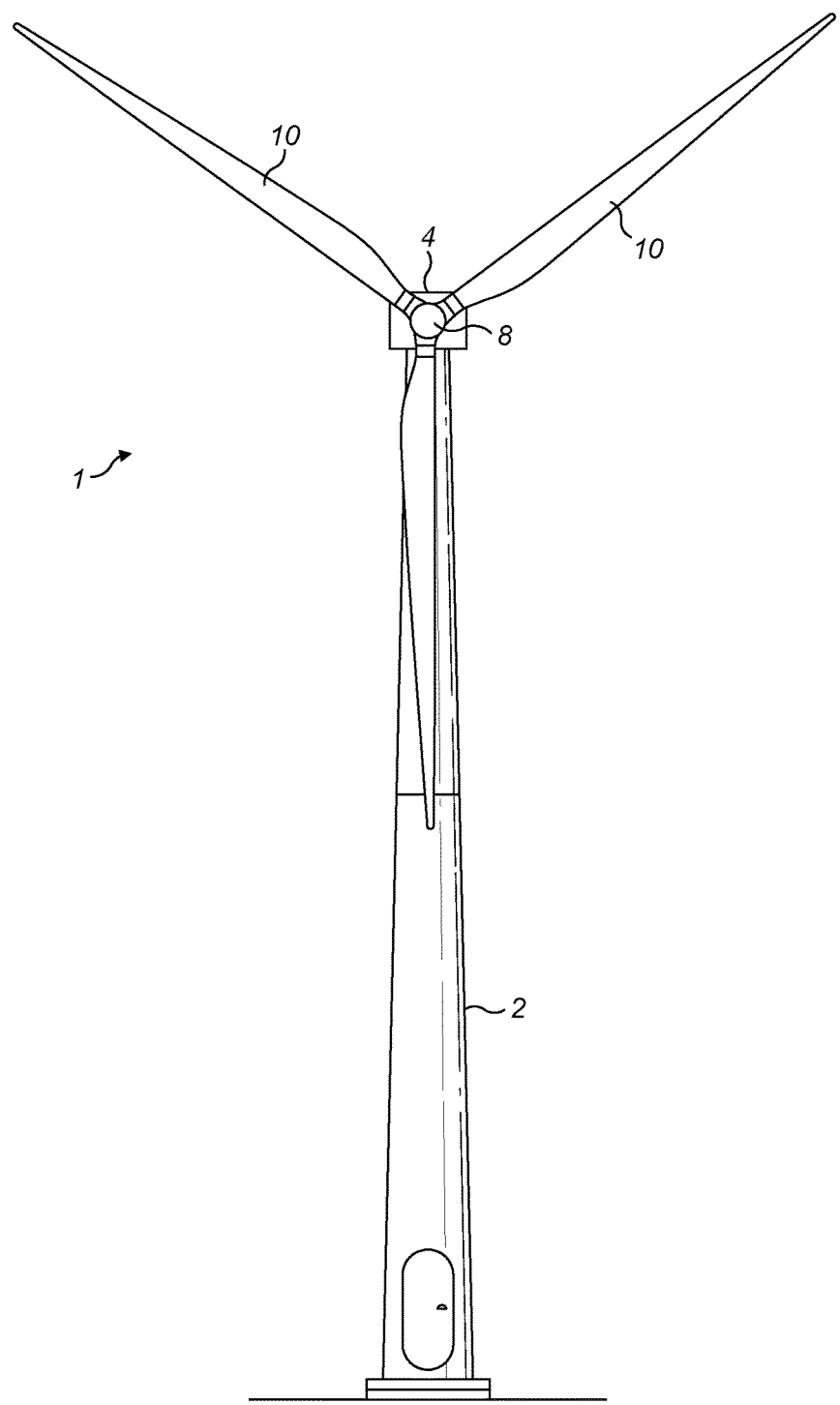
FIG. 1 is a schematic diagram of a wind turbine in which an electrical power generator according to an embodiment of the present invention may be implemented.

In the drawings, like features are denoted by like reference signs.

SPECIFIC DESCRIPTION

A specific embodiment of the invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

In order to place the embodiments of the invention in a suitable context, reference will firstly be made to FIG. 1, which illustrates a typical Horizontal Axis Wind Turbine (HAWT) in which an electrical power generator according to an embodiment of the invention may be implemented. Although this particular image depicts an on-shore wind turbine, it will be understood that equivalent features will also be found on off-shore wind turbines. In addition, although such wind turbines are referred to as 'horizontal axis', it will be appreciated by the skilled person that for practical purposes, the axis is usually slightly inclined to prevent contact between the rotor blades and the wind turbine tower in the event of strong winds.

As previously mentioned, the wind turbine 1 comprises a tower 2, a nacelle 4 rotatably coupled to the top of the tower 2 by a yaw system (not shown), a rotating hub or 'rotor' 8 mounted to the nacelle 4 and a plurality of wind turbine rotor blades 10 coupled to the hub 8. The nacelle 4 and rotor blades 10 are turned and directed into the wind direction by the yaw system.

Figure 2:
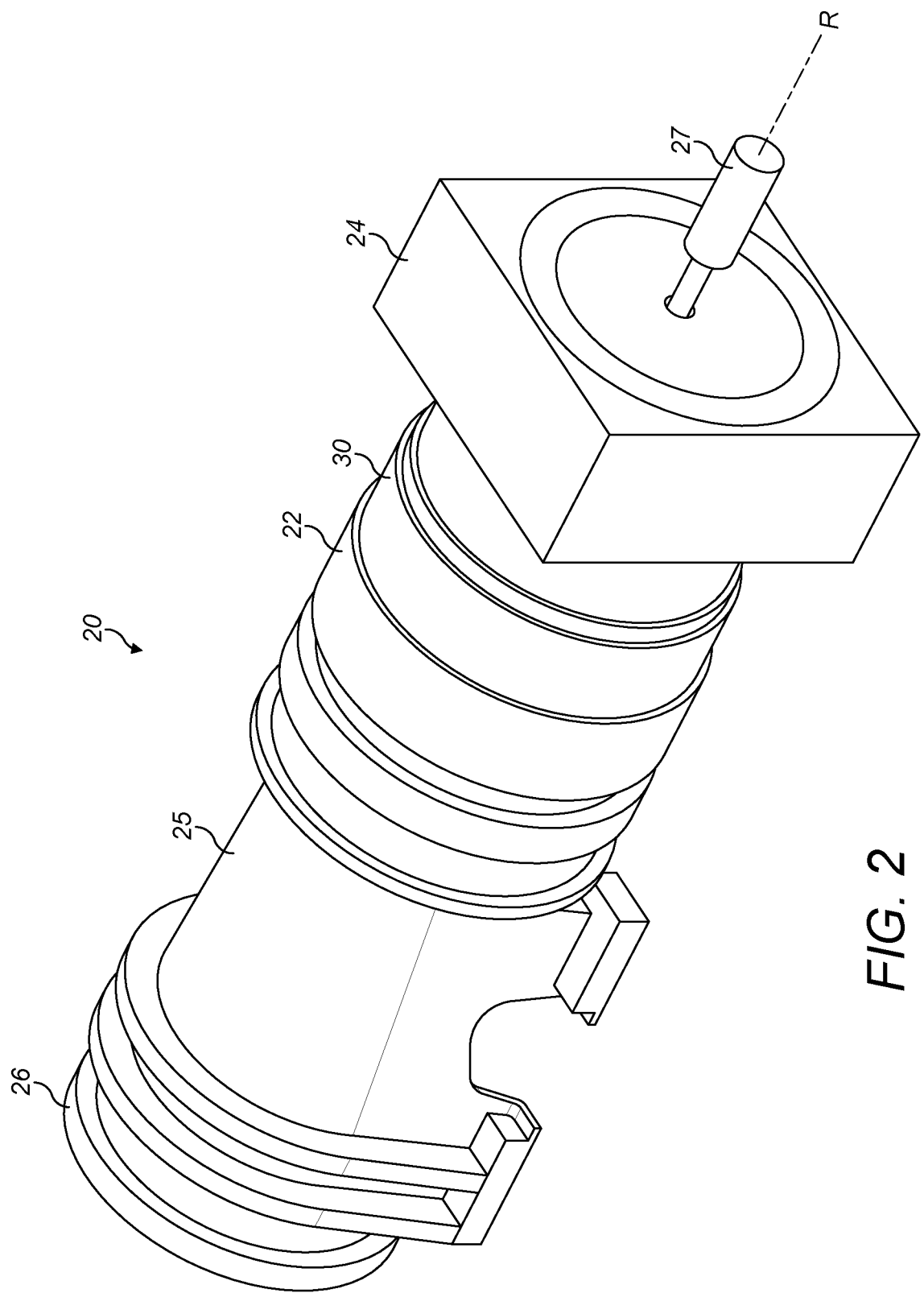
FIG. 2 is a schematic diagram of various functional power generating components located within the wind turbine nacelle of FIG. 1.

With reference to FIG. 2, the nacelle 4 may include an electrical power generating assembly 20, which includes a gearbox 22 and a generator 24. A main shaft 26, is supported by a main bearing housing 25 and is connected to, and driven by, the rotor 8 and provides input drive to the gearbox 22. The gearbox 22 steps up the rotational speed of the low speed main shaft 26 via internal gears (not shown) and drives a gearbox output shaft (not shown). The gearbox output shaft in turn drives the generator 24, which converts the rotation of the gearbox output shaft into electricity. The electricity generated by the generator 24 may then be converted by other components (not shown) as required before being supplied to an appropriate consumer, for example an electrical grid distribution system. So-called "direct drive" wind turbines that do not use gearboxes are also known. In a direct drive wind turbine, the generator is directly driven by a shaft connected to the rotor.

A so-called 'pitch tube' 27 may be arranged to pass along the centre of the generator 24 and the gearbox 22 to provide hydraulic and/or electrical services to the hub. As indicated previously, the term 'pitch tube' is considered to be a conventional engineering term used to refer to the service conduit that extends through the generator 24 and gearbox 22, and contains the appropriate hydraulic and/or electrical cables and other components within it that provide the required hydraulic and electrical services to the hub 8. Thus, the pitch tube 27 is coaxial with the rotational axis of the wind turbine drive line, as depicted by the reference 'R'.

The gearbox 22 and generator 24 may be coupled together in an integrated unit to form the electrical power generating assembly 20. Such an integrated unit is shown in FIG. 2, but it should be noted that the gearbox and generator need not be integrated and could instead be separated axially. This close integration of the gearbox 22 and the generator 24 is a configuration typical of medium-speed wind turbines, as was previously mentioned.

With reference generally to the gearbox 22, a gearbox housing 30 is generally cylindrical in form and is oriented such that its major rotational axis is horizontal, in the orientation of the drawings. The cylindrical configuration of the gearbox housing 30 is due to the specific type of gearbox that is used in the illustrated embodiment, which is an epicyclic gearbox. As the skilled person would know, an epicyclic gearbox comprises a series of planet gears that are arranged about a central sun gear, and which collectively are arranged within an encircling ring gear. The ratio of the number of teeth between the ring gear, the planet gear and the sun gears determines the gear ratio of the gearbox. For clarity, fine detail of the gearbox will not be described in further detail here as the gearbox is not the principal subject of the invention. Suffice to say that other gearbox configurations could also be used, although it is currently envisaged that an epicyclic gearbox provides an elegant solution fit for the confines of a wind turbine nacelle.

Figure 3:
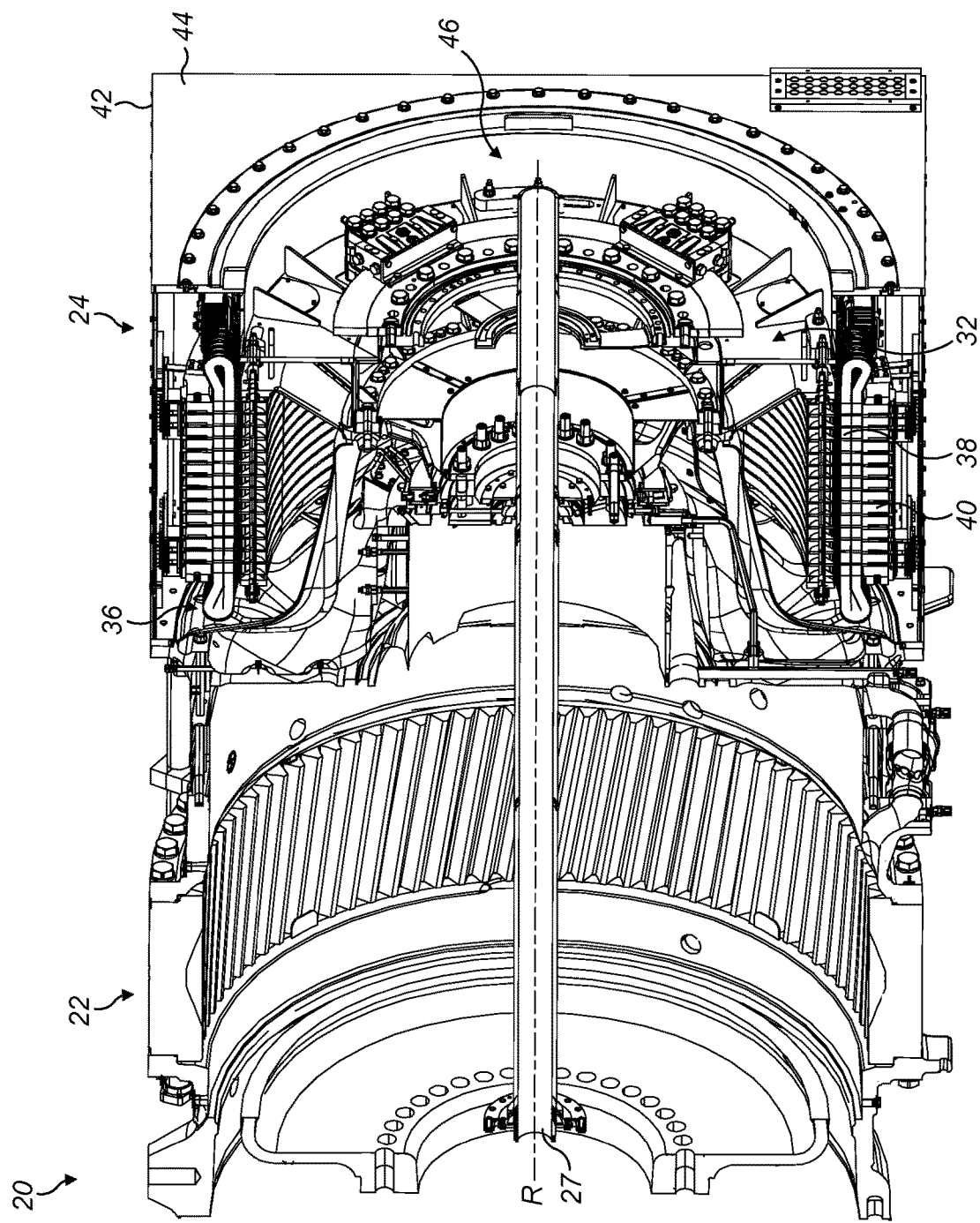
FIG. 3 is a sectional view of a power generating assembly illustrating further details of the integrated gearbox and generator shown in FIG. 2.

The focus of this discussion relates generally to the installation of the pitch tube 27 within the integrated power generating assembly 20, with particular reference to the interface between the pitch tube 27 and the generator 24, as well as installation and assembly of a closure or cover for an end opening of the generator 24. For context and ease of reference, some details of the generator 24 will now be described with reference to FIG. 3, which shows the components of the generator 24 more clearly.

It should be noted here that for brevity and clarity some components of the generator are not shown or described so as not to detract from the focus of this discussion. For example, the drive shaft by which the generator 24 is coupled to the gearbox 22 is not shown. However, it should be noted that the output shaft of the gearbox 22 interfaces with a rotor 32 of the generator 24. As such, the major axis of the gearbox output shaft defines the rotational axis of the generator 24, which coincides with the horizontal path of the pitch tube 27 shown extending through the centre of the gearbox 22 and generator 24.

The generator 24 in the illustrated embodiment is an IPM (interior permanent magnet) electric machine having an external stator 36 which surrounds the rotor 32. By 'external', it is meant that the stator 36 is in a radially outer position relative to the rotor 32 with respect to the rotational axis R and surrounds it as compared to generator designs in which the rotor is external to the stator. In this way, the rotor 32 rotates in the cylindrical volume defined by the stator 36.

The stator 36 includes stator windings 38, a stator core 40, and a stator frame (not shown in FIG. 3) which surrounds and supports the stator windings 38 and stator core 40. At this point, it should be noted that the invention is not restricted to the specific configuration of stator that is shown here.

The active components of the generator 24 are housed within a generator housing 42 which in this embodiment is cuboidal in form. The generator housing 42 comprises an end face 44 having an opening 46 via which the components of the generator 24 (in particular the rotor 32) may be accessed. However in operation, the end opening 46 of the generator housing is typically covered by a closure (not shown in FIG. 3).

Figure 4:
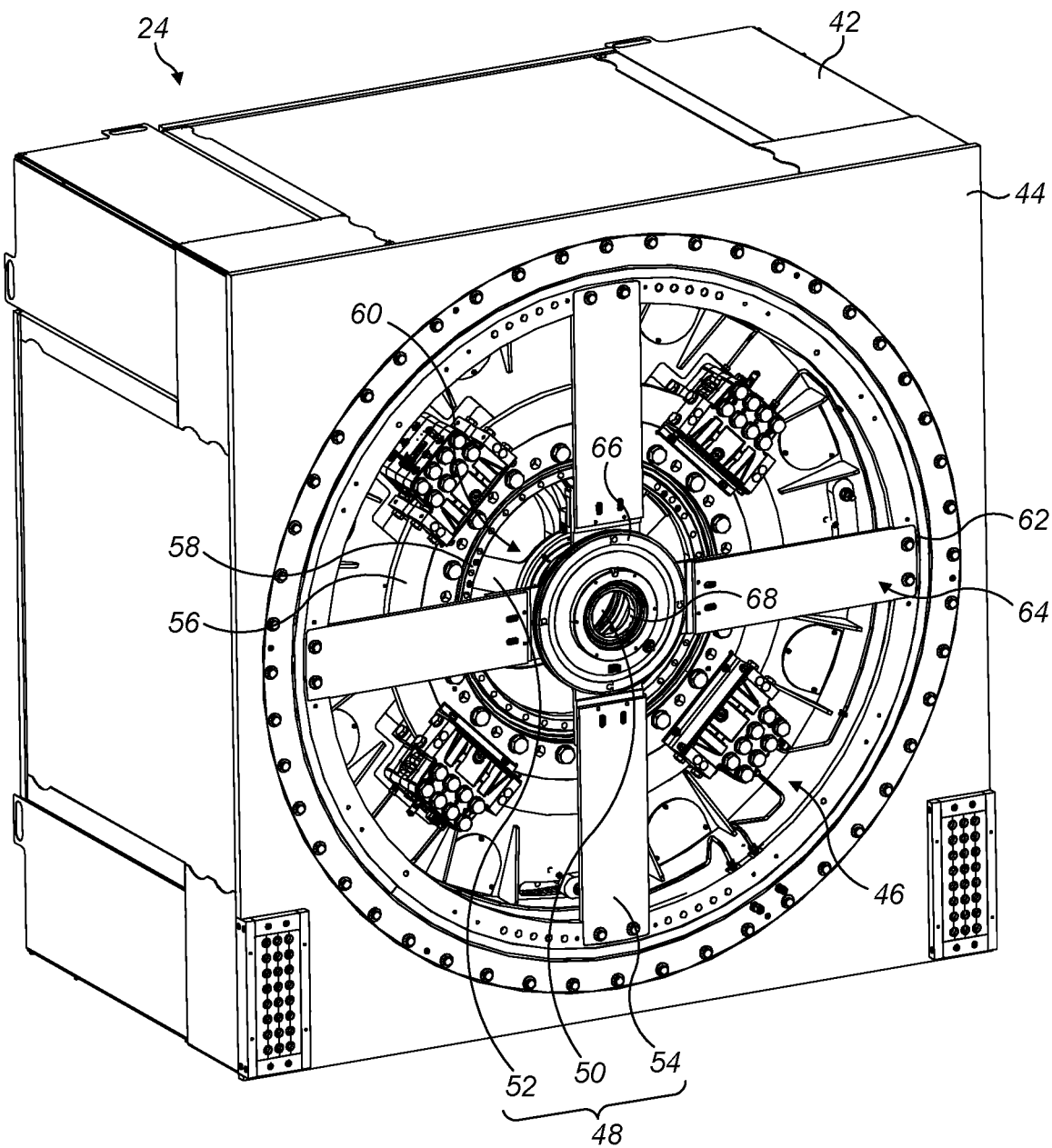
FIG. 4 is a perspective view of the wind turbine generator shown in FIG. 2, illustrating how a pitch tube may be mounted within the generator according to an embodiment of the present invention.

FIG. 4 shows further details of the generator 24 at an intermediate point of installation, as well as components of a mounting assembly 48 for the pitch tube 27. This illustration is taken at a snapshot in time subsequent to the mounting of the pitch tube 27 within the generator 24 but prior to assembly and installation of the closure for the end opening 46 of the generator housing 42. For clarity and ease of viewing of the components of the mounting assembly 48, the pitch tube 27 is also not shown in the figure; its intended location is however indicated by an arrow for context.

The pitch tube mounting assembly 48 comprises a bearing arrangement 50 that is arranged concentrically around the pitch tube 27 and provides support to retain the pitch tube 27 in a desired location and orientation within the generator 24 relative to the rotor 32. The bearing arrangement 50 is located proximate to the end opening 46 of the generator housing 42, and is generally in line or aligned with the end face 44 of the generator housing 42; in other words the bearing arrangement 50 is generally 'in plane' or co-planar with the generator housing end face 44.

The pitch tube mounting assembly 48 also comprises a plurality of supports 52, 54 for supporting the bearing arrangement 50. Specifically, primary supports 52 are provided which connect the bearing arrangement 50 to a component associated with a rotating reference frame of the generator 24; secondary supports 54 are also provided which connect the bearing arrangement 50 to a component associated with a stationary reference frame of the generator 24.

The term 'rotating reference frame' is used here and subsequently in the specification to refer to components of the generator 24 that, when the wind turbine is in operation, are undergoing rotational motion, for example components of the generator rotor 32 such as the rotor brake disk 56. Similarly, the term 'stationary reference frame' is used here and subsequently in the specification to refer to components of the generator 24 that, during normal operation of the wind turbine, are substantially stationary relative to the rotor 32. For example, this term could include not only portions of the generator housing 42, but also portions of the stator 38 which surrounds the rotor 32 and which also does not carry out rotational motion during normal wind turbine operation.

In the illustrated embodiment, each of the primary supports has two ends: a first end 58 connected to the bearing arrangement 50, and a second end 60 connected to a component of the rotor 32 (for example, the rotor brake disk 56). Similarly, each of the secondary supports has two ends: a first end 62 connected to the bearing arrangement 50, and a second end 64 connected to a component of the generator housing 42 at the end face 44.

The bearing arrangement 50 in the illustrated embodiment of FIG. 4 takes the form of an annular central disk or plate 66 comprising a bearing seat 68 that is configured to receive and support the pitch tube 27 within it. Four primary supports 52 are provided which are arranged at substantially equal intervals around the circumference of the central plate 66 (i.e. the separation between adjacent primary supports is around 90 degrees and adjacent primary supports are arranged generally orthogonal to one another). Each primary support 52 takes the form of an L-shaped bracket that extends between the central plate 66 and the rotor brake disk 56.

Four secondary supports 54 are also provided in the illustrated embodiment and these are also arranged at substantially equal angular intervals around the circumference of the central plate 66 (i.e. the separation between adjacent secondary supports is also around 90 degrees). Each secondary support 54 takes the form of an elongate, generally planar, rectangular support arm that extends radially outwards from the central plate 66 to interface with a portion of the end face 44 of the generator housing 42. The primary and secondary supports 52, 54 are connected to the respective components of the generator 24 and bearing arrangement 50 (central plate 66 and generator housing 42 or rotor 32) by appropriate fasteners, for example bolts or screws.

It will be appreciated, however, that other embodiments are also possible within the scope of the present invention in which the form taken by the primary and/or secondary supports 52, 54, and/or the number of primary and/or secondary supports 52, 54 may be varied, provided the appropriate support functionality for the pitch tube 27 is maintained.

Now that the components of the pitch tube mounting assembly 48 have been described, a method of installation of the pitch tube 27 according to an embodiment of the present invention will now be set out. In its most general sense, the installation method comprises two main steps—a first, primary installation step that is illustrated in FIGS. 5a to 6b; and a subsequent, secondary installation step that is illustrated in FIGS. 7a and 7b. The primary installation step initially involves supporting the pitch tube 27 on a component associated with a rotating reference frame of the generator 24, for example one of the components of the generator rotor 32 such as the rotor brake disk 56. The secondary installation step then involves supporting the pitch tube 27 on a component associated with a stationary reference frame of the generator 24, for example a portion of the generator housing 42 or a portion of the stator 38.

Each of these steps themselves, as well as the order in which the steps are performed, is particularly advantageous. The primary installation step provides an important benefit of enabling accurate positioning and alignment of the pitch tube 27 along and relative to the rotational axis R of the generator 24. Such accurate alignment is especially useful as it provides an accurate positioning datum for the pitch tube 27, which in turn enables the desired clearances and orientations of the pitch tube 27, relative to the other (rotating) components within the generator 24, to be achieved. In addition, the gaps between the primary supports 52 after they have been installed facilitate accessibility of internal components of the generator rotor 32 for checks and maintenance services to be carried out. The secondary step in which the pitch tube 27 is connected to a stationary component of the generator 24 such as the generator housing 42 then ensures long-term strong and stable support to maintain the desired pitch tube alignment (accurately achieved via the primary installation step) during the operational lifetime of the wind turbine 1.

Figure 8A:
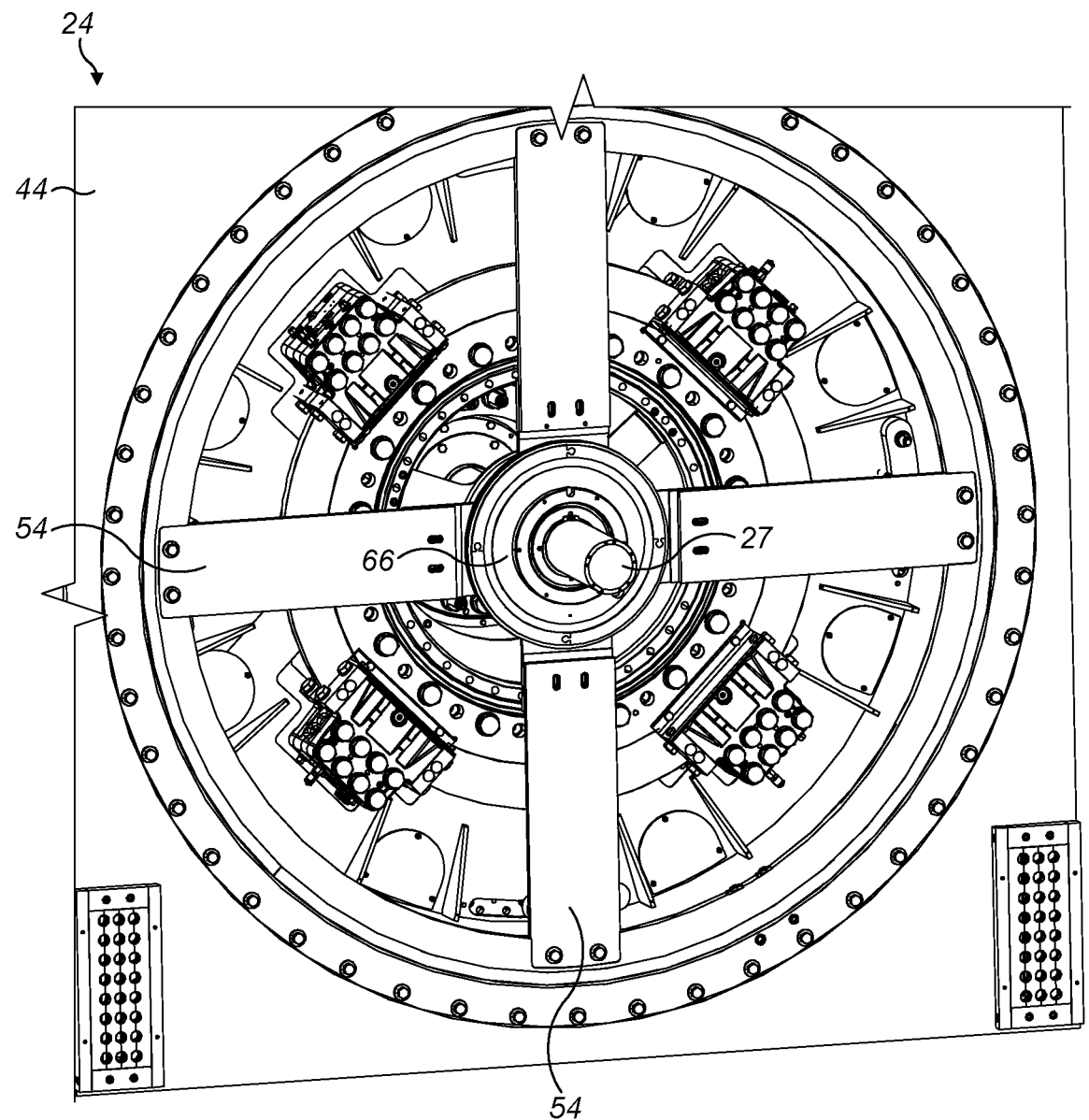
FIGS. 8a and 8b are front, and perspective exploded views respectively of the generator of FIG. 4 illustrating the installation of an end-shield for the generator housing according to an embodiment of the present invention.

After the secondary supports have been connected, a further step is then carried out. Specifically, once the secondary supports 54 have been secured in place and the pitch tube 27 is securely supported by the generator housing 42, the primary supports 52 are removed or disconnected, such that only the secondary supports 54 are retained and provide long-term support for the pitch tube 27 and bearing arrangement 27 during the operation of the wind turbine. This configuration is shown in FIG. 8a.

Now considering the primary installation step (supporting the pitch tube 27 on a component associated with a rotating reference frame of the generator) in detail, it is noted that in practice, this step may be implemented in two different ways.

Figure 5A:
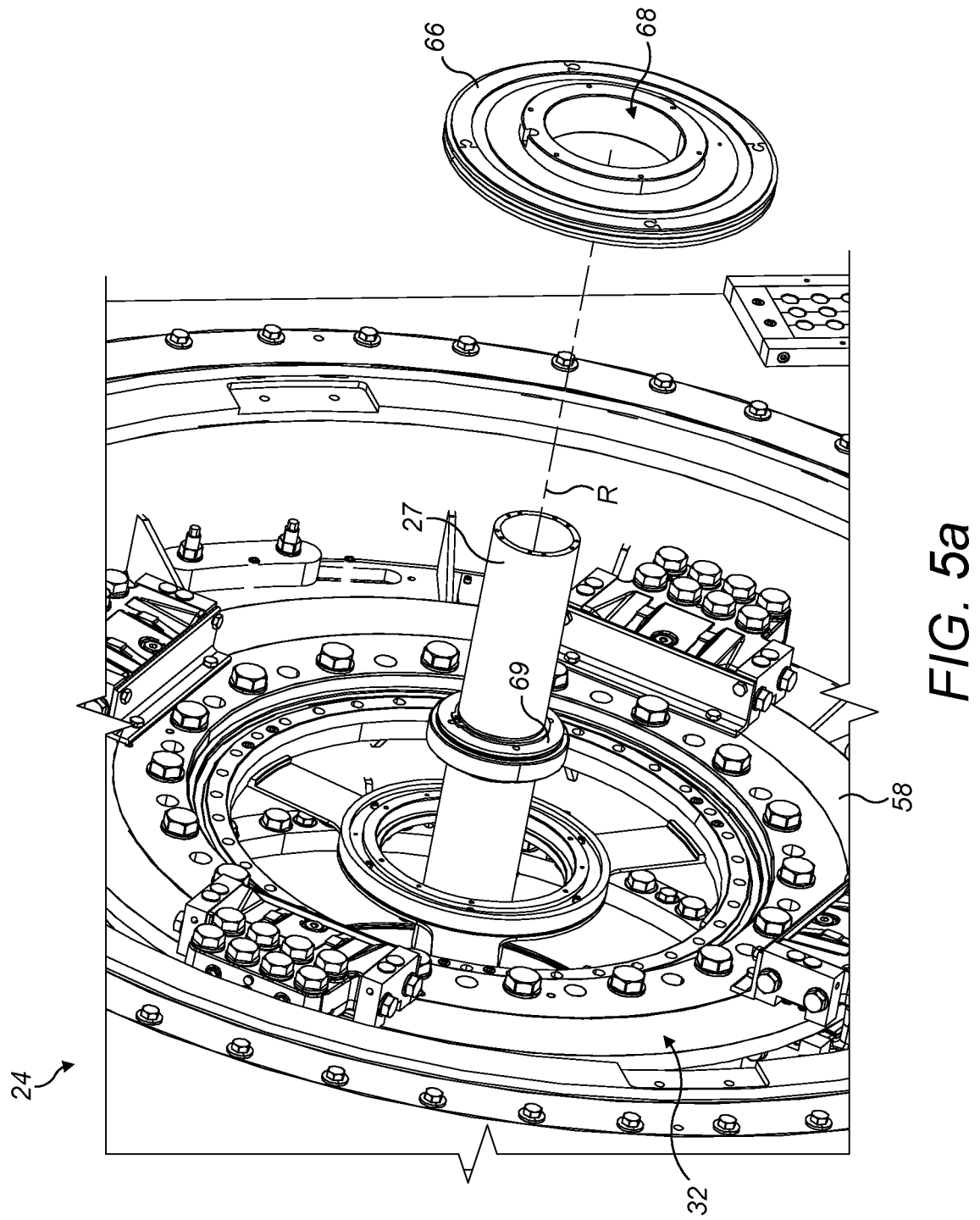
FIGS. 5a and 5b are perspective exploded views of the generator of FIG. 4 illustrating an example implementation of a primary pitch tube installation step, according to an embodiment of the present invention, for mounting the pitch tube to a component associated with a rotating reference frame of the generator.
Figure 5B:
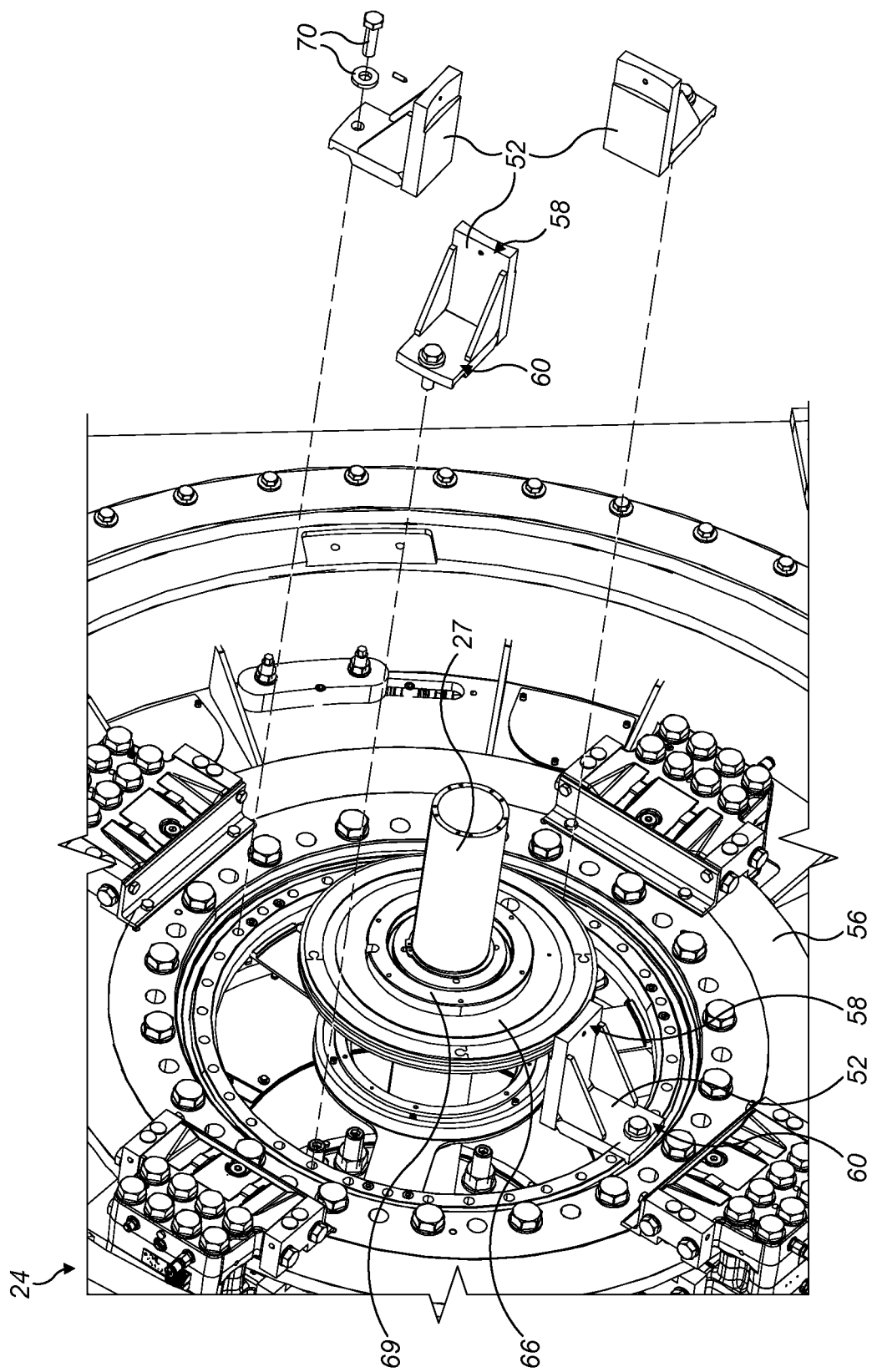

In a first implementation, as is illustrated in FIGS. 5a and 5b, the pitch tube 27 is first positioned in its desired location within, and extending along the central rotational axis R of, the generator 24. The central plate 66 of the bearing arrangement 50 is then located on and around a portion of the pitch tube 27, proximate to the end opening 46 of the generator housing 42, and generally in line with the generator housing end face 44. A support bearing 69 of the pitch tube 27 is seated in the bearing seat 68 within the central plate 66. Subsequently, the central plate 66 is secured to the generator 24 by attaching the primary support brackets 52 to connect the central plate 66 to the rotor 32. Each of these primary support brackets 52 can initially be loosely attached in its desired position around the circumference of the central plate 66 (e.g. using fasteners 70 such as loose bolts and lock screws). This allows fine adjustment of the bearing arrangement 50 and the associated pitch tube 27 to be carried out as required thereby ensuring accurate positioning and alignment of the pitch tube 27 within the generator 24 and relative to the other (rotating) components of the generator 24. The fasteners for the primary support brackets 52 are then tightened once the desired alignment has been achieved.

Figure 6A:
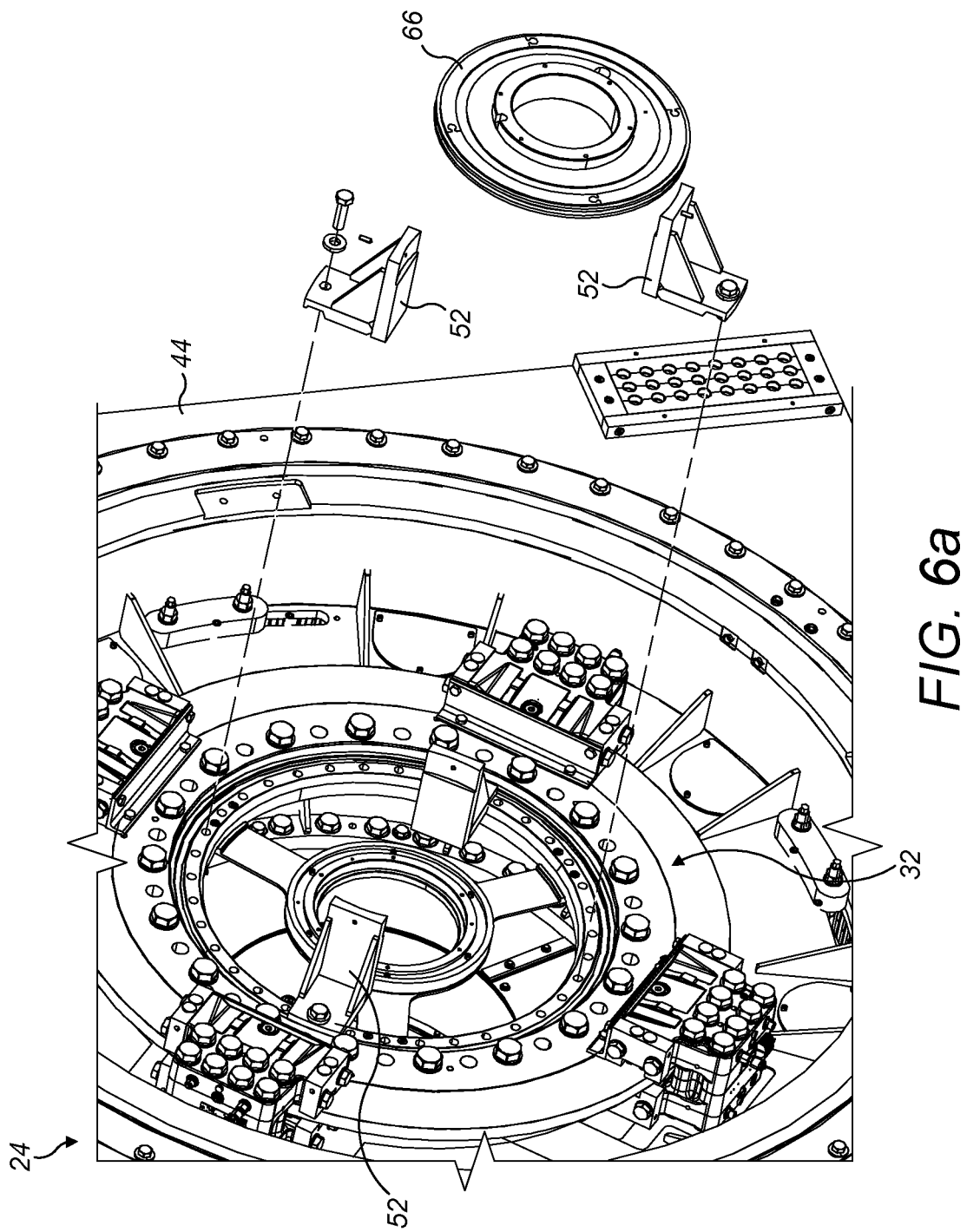
Figure 7A:
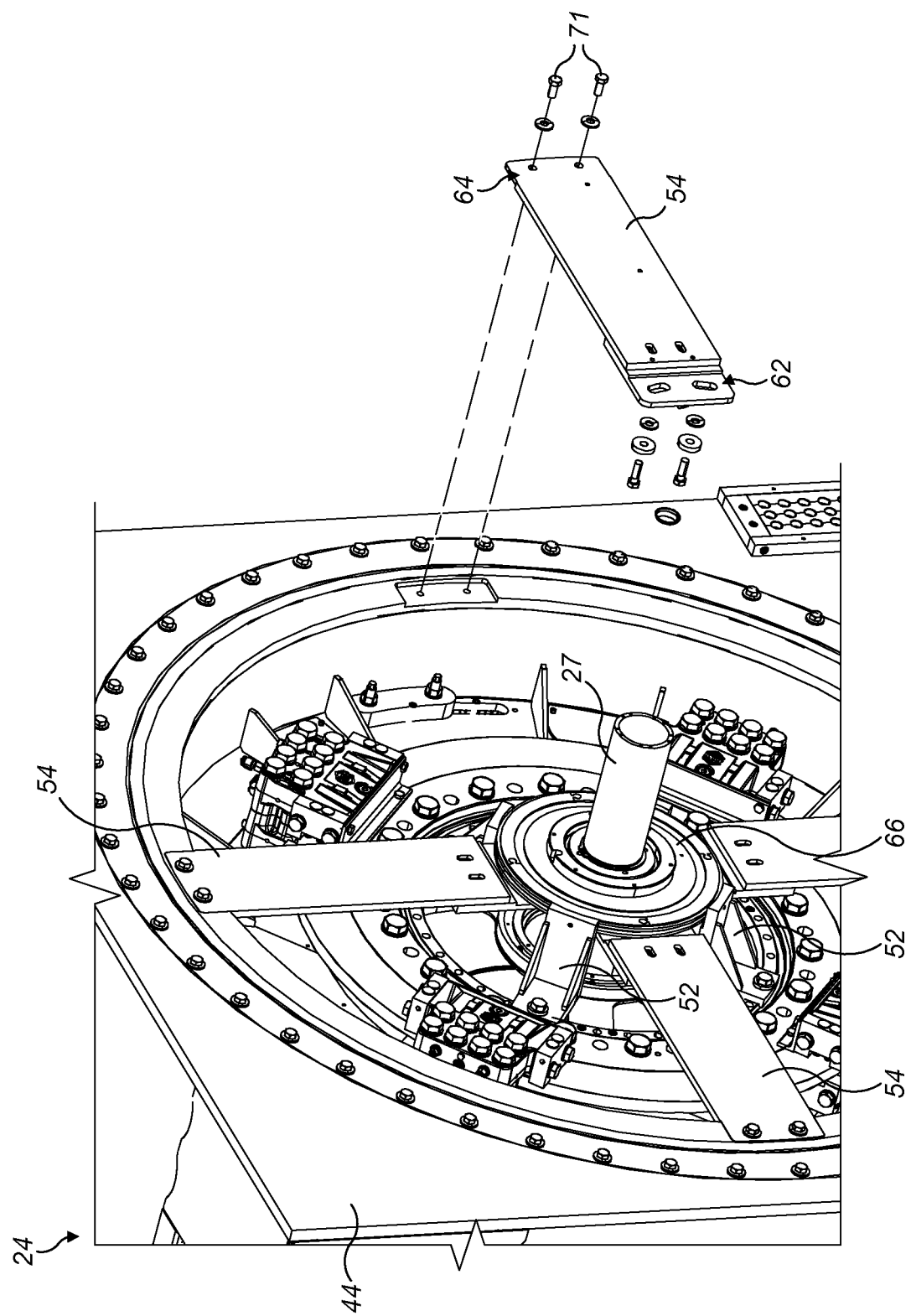
FIGS. 7a and 7b are perspective and perspective exploded views respectively of the generator of FIG. 4 illustrating a secondary pitch tube installation step, according to an embodiment of the present invention, for mounting the pitch tube to a component associated with a stationary reference frame of the generator.
Figure 7B:
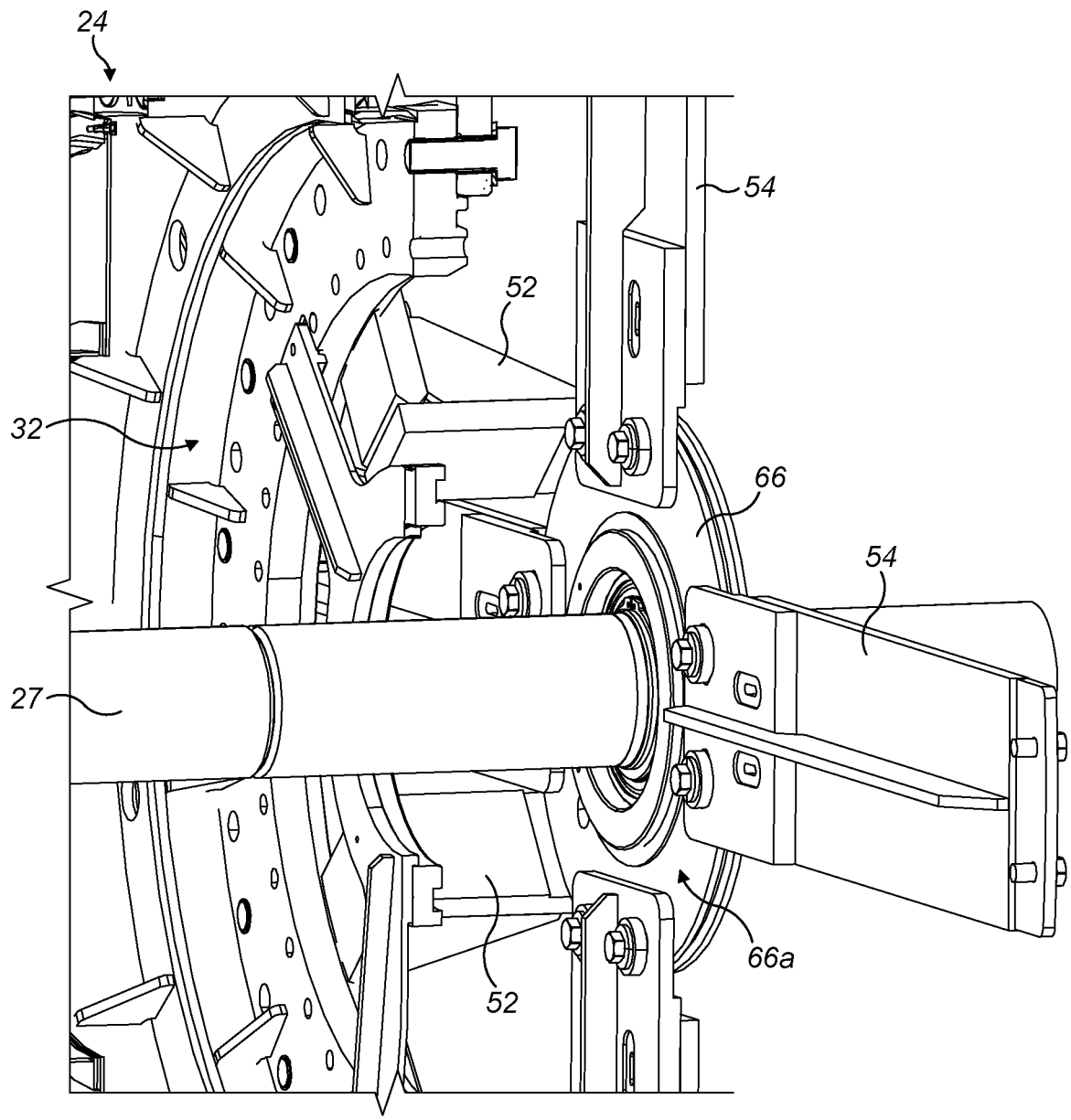

FIGS. 6a and 6b illustrate an alternative implementation of the primary installation step, in which the above-described steps can effectively be performed in reverse. As shown in FIG. 6a, the central plate 66 of the bearing arrangement 50 is first located in its appropriate position within the generator 24—proximate to the end opening 46 of the generator housing 42, and generally in line, coplanar or otherwise aligned with the generator housing end face 44. The primary support L-shaped brackets 52 are then connected between the central plate 66 and the appropriate component of the rotor 32 to secure the bearing arrangement 50 in place. Subsequently, as shown in FIG. 6a, the pitch tube 27 is inserted through the annular central plate 66 and the support bearing 69 of the pitch tube 27 can be seated within the central plate 66.

Regardless of which of the above implementations of the primary installation step is used, once the pitch tube 27 and bearing arrangement 50 are securely supported by the primary supports 52, the secondary installation step of attaching the secondary supports 54 is then carried out. This step is illustrated in FIG. 7*a*, where it can be seen that each of the secondary supports 54 is attached to the central plate 66 (via first end 62) and to the generator housing component (via second end 64) using fasteners 71, such as bolts or screws. The end-product (initially shown in FIG. 4) of the pitch tube installation method is shown in greater detail in FIG. 7*b*; this figure provides a close-up perspective view of the pitch tube 27, the bearing arrangement 50, and the primary and secondary supports 52, 54, when viewed from inside the generator 24. As can be seen from this figure, the first end 62 of each secondary support 54 extends a distance radially-inward towards the pitch tube 27 along a rear face 66*a* of the central plate 66 (i.e. the face of the central plate 66 that faces inwardly towards the generator's internal components). The secondary supports 54 thereby provide additional support to the central plate 66 and maintain the bearing arrangement 50 in its desired location along the rotational axis R of the generator 24. It should be noted that each of the secondary supports is shown as a composite member in which the first end and second end of the support arms are separate planar sections that are able to slide relative to one another and be locked by the use of lock bolts. This allows fine adjustment of the support arms to connect between the generator housing and the pitch tube bearing.

Figure 8B:
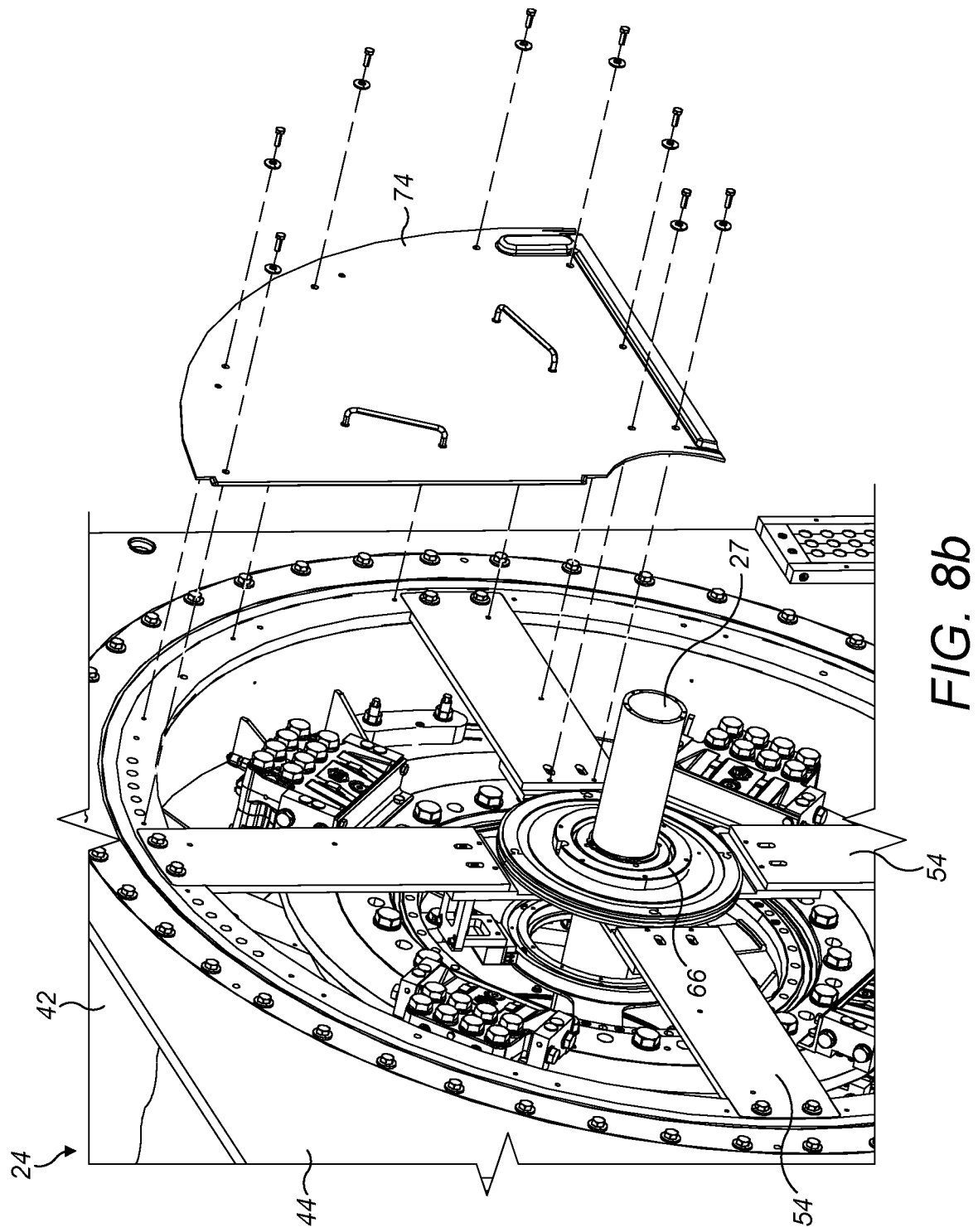

Subsequently, appropriate steps can then be taken to close the end opening 46 of the generator housing 42; these steps are illustrated in FIGS. 8*a* and 8*b*.

Figure 9:
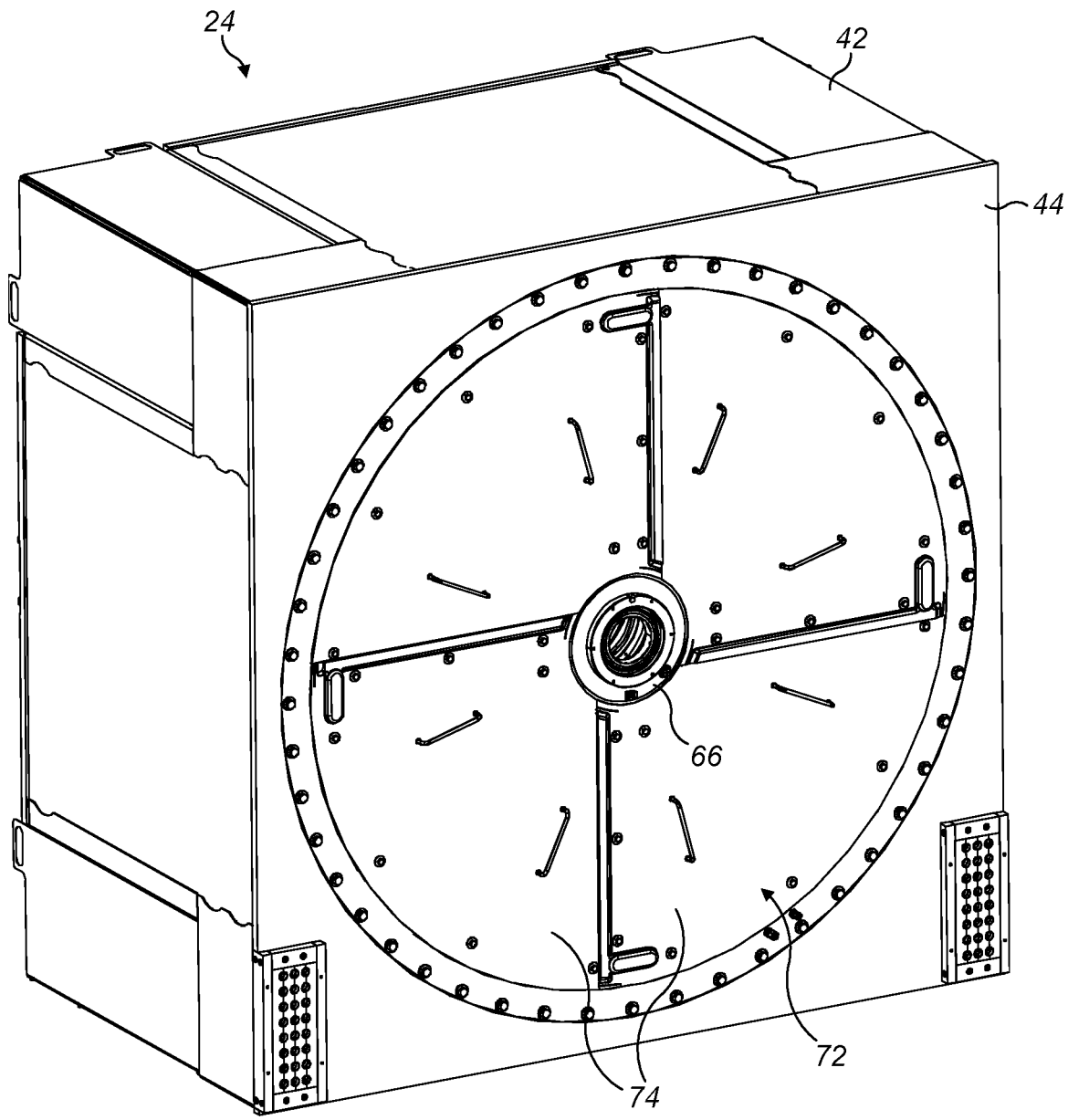
FIG. 9 is a perspective view of the generator, showing the end-shield installed in place following the method steps shown in FIGS. 8a and 8b.

Closure of the generator end opening 46 begins with the disconnection and removal of the primary supports 52, the end-result of which is illustrated in FIG. 8*a*. Subsequently, an end-shield 72 is installed across the end opening 46 of the generator 24 and is positioned generally in line with the end face 44 of the generator housing 42. The end-shield 72 comprises a plurality of cover components 74 that are installed individually (as shown in FIG. 8*b*), and which are supported by and connected to the secondary support arms 54, as well as to the generator housing 42. The generator end-product following the end-shield installation is illustrated in FIG. 9, from which it can be seen that the end opening 46 of the generator 24 has been closed, and the internal components of the generator 24 (such as the rotor 32) are no longer readily accessible. It is in this configuration that normal operation of the wind turbine 1 will take place.

In the specific embodiment shown in FIGS. 8*b* and 9, the end-shield 72 comprises four cover components 74, each one taking the form of a generally quadrant-shaped plate that is attached to at least one of the secondary support arms 54 and, when in situ, extends outwards to the generator housing 42 from the circumference of the bearing arrangement central plate 66. This attachment of the cover components 74 is illustrated particularly clearly in FIG. 8*b*, from which it can also be seen that the radially-inner edge of each cover component 74 is shaped as an arc that follows the curvature of the portion of the central plate 66 circumference with which the respective cover component 74 interfaces. In other words, the combination of the central plate 66 and the four cover component quadrants 74 spans and closes the generator end opening 46, providing a substantially continuous cover or closure across the open end of the generator housing 42. As can be seen from FIG. 8*b*, the pitch tube 27 will extend outwards through the end-shield 72 after its installation, along the rotational axis R of the generator 24, to interface with other components (not shown) of the wind turbine 1.

The use of a plurality of cover components 74 supported on a plurality of secondary support arms 54 reduces the weight associated with each individual component of the end-shield 72, especially relative to existing systems which comprise a single solid generator end-closure. Utilising a plurality of cover components 74 increases the ease of portability and installation of the end-shield, since each cover component 74 can be handled and installed separately, and is therefore less unwieldy than a single-piece end closure would be. Subsequent disassembly of (some or all of) the end-shield 72 after the generator 24 has been installed within the wind turbine is thereby also made easier. For example, some or all of the cover components 74 may be removed in order to permit access to internal components of the generator 24 during the operational lifetime of the wind turbine 1. This facilitates carrying out of maintenance activities such as servicing the rotor brake disk, which may take place during the operational lifetime of the wind turbine, due to the gaps between the secondary supports 54 which remain in place to support the pitch tube 27 even after the cover components 74 have been removed.

Figure 10:
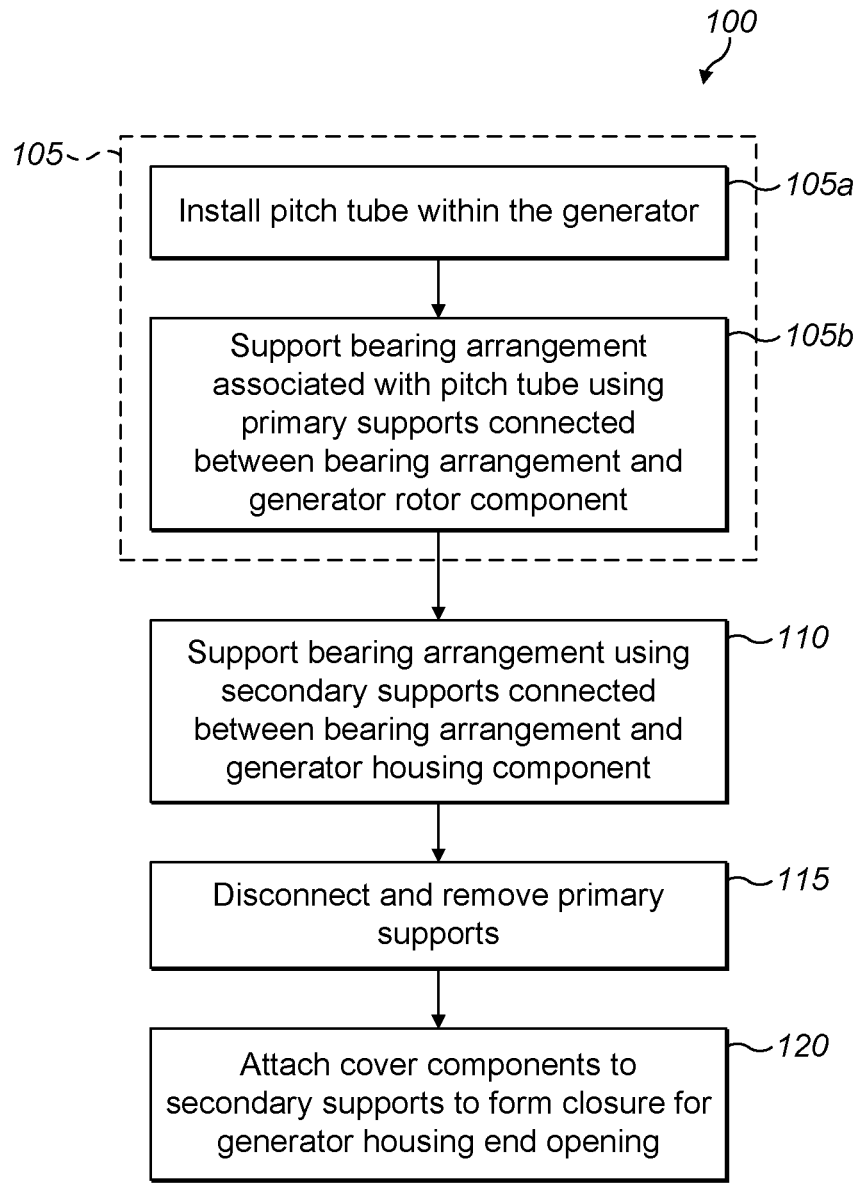
FIG. 10 is a flow diagram illustrating steps in the pitch tube and end-shield installation method shown in FIGS. 5a to 8b.

The above-described method for installing the pitch tube 27 and the end-shield 72 is summarised in FIG. 10. This method 100 comprises primary and secondary pitch tube installation steps 105, 110 which are performed sequentially. As discussed previously, the primary installation step 105 involving accurate positioning of the pitch tube 27 can be broken down into two sub-steps: a first sub-step 105*a* of installing the pitch tube 27 within the generator 24; and a second sub-step 105*b* of connecting the supporting bearing arrangement 50 to a component of the generator rotor 32 via primary supports 52. These order in which these two sub-steps are performed is interchangeable. The secondary installation step 110 then involves connecting the bearing arrangement 50 (and pitch tube 27) to a component of the generator housing 42 via secondary supports 54. A third step 115 is then performed which involves disconnection and removal of the primary supports 52 whilst leaving the secondary supports 54 in place. The final step of the method is the end-shield 72 installation step 120, in which the cover components 74 are attached to the secondary supports 54 and the generator housing end face 44.

Many modifications may be made to the above examples without departing from the scope of the present invention as defined in the accompanying claims.

For example, although the illustrated embodiments show each cover component 74 being attached to only one of the secondary supports 54, it will be appreciated that an alternative configuration would be possible in which each cover component 74 is attached to, and extends between, a pair of angularly adjacent secondary supports 54.

In addition to the advantages described above in relation to the installation and assembly of the pitch tube into the generator housing, it should be noted that further advantages are apparent in relation to in-service maintenance and also decommissioning efforts, In such situations, it is often required to remove a blade from the hub and to do so the hub needs to be turned into a predetermined position to allow removal of the blade. Controlled rotation of the hub is carried out typically by a turner gear that couples to a point of the powertrain of the wind turbine. The point of coupling may be at the gearbox stage, but in the illustrated embodiment one option is to couple a turner gear device to the end of the generator housing so it engages with the generator and so is able to rotate the epicyclic gearbox and, thus, the main rotor shaft. In such a circumstance, it will be appreciated that it would be possible to remove the end shield cover components 74 and the secondary support arms 54, and re-install the primary support brackets 52 in order to provide sufficient space to mount a turner gear to the housing. So, the replacement of the end-shield and secondary support arms with the primary support brackets will advantageously improve the ease with which such a component may be introduced into the system.

The invention claimed is:

1. A method of installing a pitch tube into an electrical power generator for a wind turbine, the method comprising:
   installing the pitch tube so that it is coaxial with a rotational axis of the generator;
   supporting a bearing arrangement associated with the pitch tube at an end of the generator using one or more primary supports, wherein each of the primary supports comprises a first end connected to the bearing arrangement and a second end connected to a component associated with a rotating reference frame of the generator;
   supporting the bearing arrangement using one or more secondary supports, wherein each of the secondary supports comprises a first end connected to the bearing arrangement and a second end connected to a component associated with a stationary reference frame of the generator; and
   after the bearing arrangement has been supported by the one or more secondary supports, disconnecting the one or more primary supports from the bearing arrangement and the component associated with the rotating reference frame of the generator.

2. The method of claim 1, further comprising, after the bearing arrangement has been supported by the one or more secondary supports, disconnecting the one or more primary supports from the bearing arrangement and the component associated with the rotating reference frame of the generator.

3. The method of claim 1, further comprising attaching a plurality of cover components to the one or more secondary supports to span an open area defined by an end opening of a generator housing.

4. The method of claim 3, wherein the attaching of the plurality of cover components is carried out after disconnecting the one or more primary supports.

5. The method of claim 4, wherein attaching the plurality of cover components comprises fitting the cover components together to define a continuous cover over the end opening of the generator housing.

6. The method of claim 1, wherein the component associated with the rotating reference frame of the generator comprises a rotor hub component of the generator, and wherein supporting the bearing arrangement using one or more primary supports comprises connecting the second end of each of the primary supports to the rotor hub component.

7. The method of claim 1, wherein the component associated with the stationary reference frame of the generator comprises a generator housing component, and wherein supporting the bearing arrangement using one or more secondary supports comprises connecting the second end of each of the secondary supports to an end face of the generator housing component.

8. The method of claim 1, wherein each of the primary supports comprises an L-shaped bracket.

9. A wind turbine comprising a wind turbine tower, a nacelle rotatably coupled to the tower, a rotating hub mounted to the nacelle, and a plurality of wind turbine blades coupled to the hub, wherein the nacelle comprises an electrical power generator having a pitch tube installed by the method of claim 1.

10. An electrical power generator for a wind turbine comprising:
    a generator housing;
    a generator rotor located within the generator housing and being accessible through an end opening of the generator housing, the rotor defining a rotational axis of the generator;
    a pitch tube extending through the rotor and being coaxial with the generator rotational axis, the pitch tube having an end that is supported by a bearing arrangement proximal with the generator housing end opening;
    a plurality of support members connected between the bearing arrangement and a component of the generator housing; and
    a plurality of cover components arranged on the plurality of support members so as to form a continuous cover for the end opening of the generator housing,
    wherein said pitch tube is installed by a method of claim 1.

11. The electrical power generator of claim 10, wherein each of the plurality of cover components extends between at least a pair of the plurality of support members.

12. The electrical power generator of claim 10, wherein each of the support members is a planar member that when connected between the bearing arrangement and the generator housing component, is positioned to coincide with an end face of the generator housing.

13. The electrical power generator of claim 10 comprising at least four support members and four cover components, wherein each of the cover components forms a quadrant of the continuous cover for the end opening of the generator housing.

14. A wind turbine comprising a wind turbine tower, a nacelle rotatably coupled to the tower, a rotating hub mounted to the nacelle, and a plurality of wind turbine blades coupled to the hub, wherein the nacelle comprises the electrical power generator of claim 10.

* * * * *